United States Patent
Choi et al.

(10) Patent No.: US 8,896,854 B2
(45) Date of Patent: Nov. 25, 2014

(54) IMAGE READING APPARATUS, MULTI-FUNCTIONAL MACHINE AND DOCUMENT DISCHARGING METHOD

(71) Applicant: SAMSUNG Electronics Co., Ltd., Suwon-si, Gyeonggi-Do (KR)

(72) Inventors: Jae Hoon Choi, Seoul (KR); Yong Sok Yang, Yongin-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/707,903

(22) Filed: Dec. 7, 2012

(65) Prior Publication Data

US 2014/0160502 A1 Jun. 12, 2014

Related U.S. Application Data

(63) Continuation of application No. 12/343,860, filed on Dec. 24, 2008, now Pat. No. 8,351,088.

(30) Foreign Application Priority Data

Mar. 26, 2008 (KR) ........................ 10-2008-0027810

(51) Int. Cl.
*G06F 15/00* (2006.01)
*H04N 1/12* (2006.01)

(52) U.S. Cl.
CPC ..................................... *H04N 1/123* (2013.01)
USPC ....................................................... 358/1.13

(58) Field of Classification Search
USPC ....................................................... 358/1.13
See application file for complete search history.

(56) References Cited

U.S. PATENT DOCUMENTS

| | | | |
|---|---|---|---|
| 6,987,523 | B2 | 1/2006 | Fujiwara |
| 7,149,011 | B2 | 12/2006 | Kawamura et al. |
| 2003/0038992 | A1 | 2/2003 | Emmenegger et al. |
| 2008/0310899 | A1* | 12/2008 | Yoo ............................... 399/397 |
| 2009/0121414 | A1* | 5/2009 | Ito .................................. 271/209 |

FOREIGN PATENT DOCUMENTS

| | | |
|---|---|---|
| JP | 2003-137468 | 5/2003 |
| JP | 2003-137648 | 5/2003 |
| JP | 2007223687 | 9/2007 |

OTHER PUBLICATIONS

Korean Office Action dated Jan. 18, 2013 issued in KR Application No. 10-2008-0027810.
English Language abstract of JP 2003-137468, published on May 14, 2003.
Machine English Language translation of JP 2003-137468, published on May 14, 2003.

* cited by examiner

*Primary Examiner* — Saeid Ebrahimi Dehkordy
(74) *Attorney, Agent, or Firm* — Staas & Halsey LLP

(57) ABSTRACT

An image reading apparatus with a structure capable of reliably discharging a document, and a multi-functional machine having the same are disclosed. The image reading apparatus includes a document feed path having a document outlet, a reading unit which reads an image of a document fed through the document feed path, and a guide member which is disposed at the document outlet downstream of the reading unit to form a curl on the trailing end portion of the document. The curl formed on the document may make it possible for a subsequent document being discharged to push the curled document out of the document outlet.

16 Claims, 6 Drawing Sheets

IMAGE READING APPARATUS, MULTI-FUNCTIONAL MACHINE AND DOCUMENT DISCHARGING METHOD

CROSS-REFERENCE TO RELATED APPLICATIONS

This application is a Continuation Application of prior of application Ser. No. 12/343,860, filed on Dec. 24, 2008 in the United States Patent and Trademark Office, which claims the benefit of Korean Patent Application No. 2008-0027810, filed on Mar. 26, 2008 in the Korean Intellectual Property Office, the disclosure of which is incorporated herein by reference.

BACKGROUND OF THE INVENTION

1. Field of the Invention

The present invention relates to an image reading apparatus, and a multi-functional machine having the same, and, more particularly, to an image reading apparatus with improved reliability of a document discharging operation, and a multi-functional machine having the same.

2. Description of the Related Art

An image reading apparatus reads an image recorded on a document through an image sensor. Devices containing image reading apparatuses include copiers, scanners, fax machines, multi-functional devices, and similar image reading machines. In order to read information from the document, the image reading machine must either move a reading unit relative to a stationary document or the document relative to a stationary reading unit. An image reading machine in which the document moves is known as a "sheet feed type".

The sheet feed type image reading machine includes an automatic document feeder which feeds the document through the machine. The document fed by the automatic document feeder is scanned by the reading unit and, once scanned, discharged to the outside. If the document is not fully discharged from the unit, the stalled document may cause the subsequently scanned and discharged document(s) to jam or shuffle out of sequence.

Many image reading machines discharge a document using a dedicated discharge roller disposed at the downstream side of the reading unit after reading an image. While the dedicated rollers may ensure the discharging of the documents, the space required for the installation of the dedicated rollers places a limit on reduction of the size of the image reading machine.

Some image reading machines discharge documents without using a discharge roller. If a document outlet of the image reading machine is positioned a sufficient distance below the reading unit, the document's own weight propels it downward to the document outlet. This configuration however unfortunately also places a limit on the minimum size of the image reading machine, particularly in the vertical dimension.

BRIEF DESCRIPTION OF THE DRAWINGS

Various aspects and advantages of the embodiments of the invention will become apparent and more readily appreciated from the following description of the embodiments, taken in conjunction with the accompanying drawings, of which.

DETAILED DESCRIPTION OF THE PREFERRED EMBODIMENTS

Figure 1:
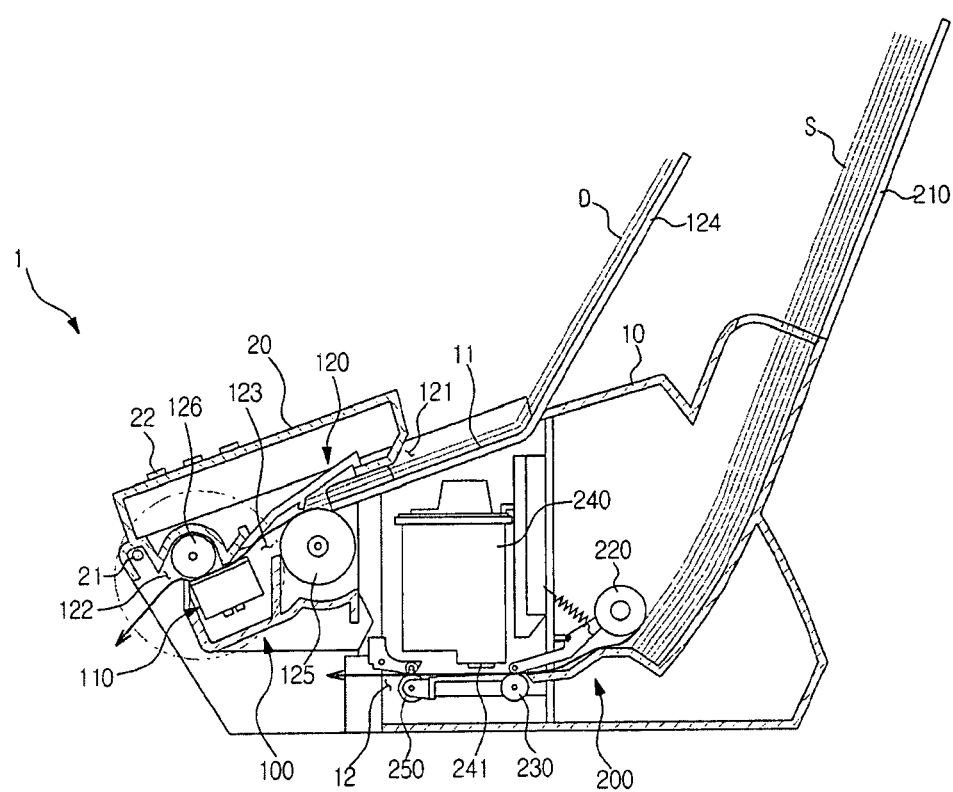
FIG. 1 illustrates a configuration of a multi-functional machine including an image reading machine according to an embodiment of the invention.

Reference will now be made in detail to exemplary embodiments of the present invention, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale, and may be exaggerated for the sake of allowing greater understanding.

Figure 2:
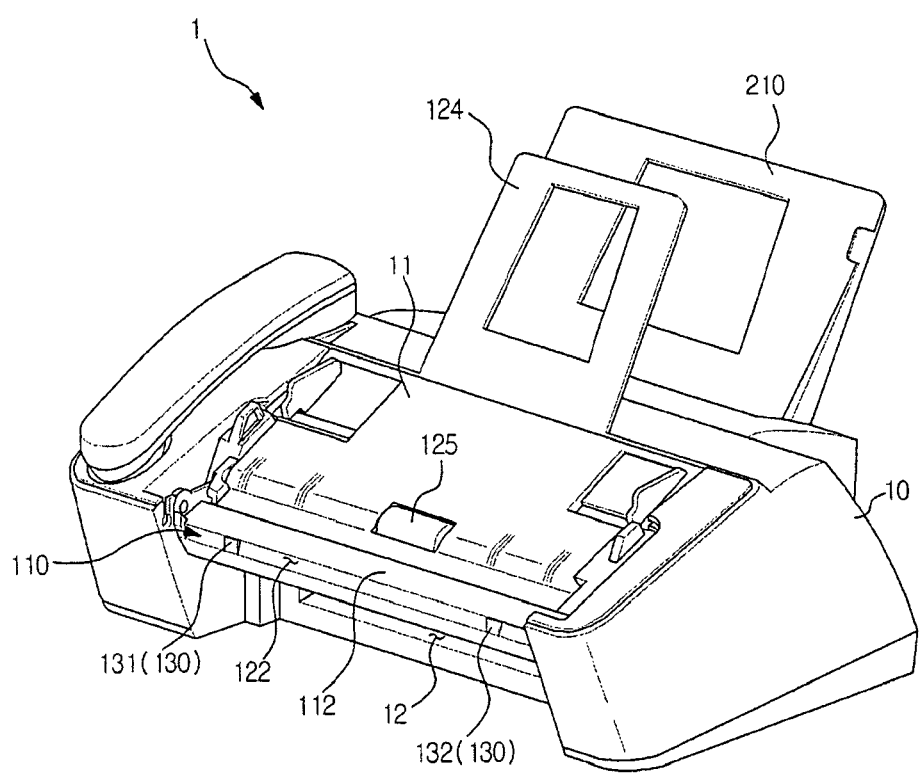
FIG. 2 illustrates a perspective view of the image reading machine of FIG. 1 according to an embodiment of the invention.

As shown in FIGS. 1 and 2, an example multi-functional machine 1 may include a main body 10, an image reading apparatus 100 which reads image information from the document, and a printing apparatus 200 which prints an image on a printing medium. FIG. 2 omits an upper cover 20 and a white roller 126 which are present in FIG. 1. Although an image reading machine is described in this embodiment as a part of a multi-functional machine including a facsimile function, the following description may be applied to other embodiments of a multi-functional machine having no facsimile function, a copying machine, a scanner and various other machines which read an image recorded on the document through a reading unit.

The main body 10 defines an external appearance of the multi-functional machine 1. Various parts forming the image reading apparatus 100 and the printing apparatus 200 may be supported in and/or on the main body 10.

The multi-functional machine 1 may include a printing apparatus 200, which prints an image on a printing medium according to the image read by the image reading apparatus 100 or according to a fax image received from an external communication network. The printing apparatus 200 may include a paper loading tray 210, a paper pickup roller 220, a paper feed roller 230, a printing unit 240 and a paper discharge roller 250. In a printing operation, a printing medium such as paper S may be loaded on the paper loading tray 210, picked up sheet by sheet by the paper pickup roller 220, and transferred toward the paper feed roller 230. The paper feed roller 230 may align the paper and supply the aligned paper to the printing unit 240. The printing unit 240 may include, in this so called ink-jet printing example, a print head 241 having a nozzle through which droplets of ink may be sprayed. Other types of printing unit, for example, and electro-photographic type printing unit may alternatively be used. In the ink-jet type example, the printing unit 240 may print an image on the paper while reciprocating in a width direction of the transferred paper. The paper discharge roller 250 may discharge the paper to the outside of the main body 10 through a paper discharge port 12.

An upper cover 20 may be installed on the main body 10. The upper cover 20 may be rotatably coupled to the main body 10 through a hinge shaft 21 disposed at one end portion of the upper cover 20, or it may be coupled by some other means. A number of control keys 22 may be disposed on a surface of the upper cover 20 to allow a user to control the multi-functional machine 1.

A document feed path 123 of the image reading apparatus 100 may be defined between an upper surface 11 of the main body 10 and the upper cover 20. A user may separate the upper cover 20 from the main body 10 to remove a document jammed in the document feed path 123 or to clean various parts installed on the inside of the main body 10.

The image reading apparatus 100 may include a reading unit 110 which reads image information from the document, and an automatic document feeder 120, which may automatically feeds the document to enable a continuous reading operation.

Figure 3:
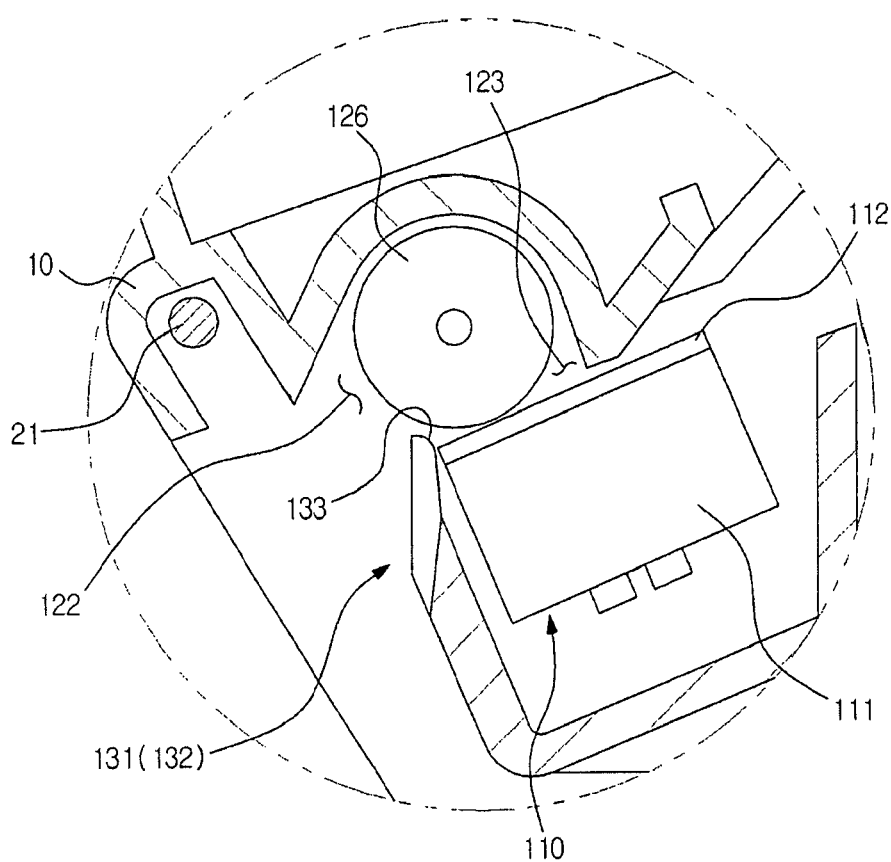
FIG. 3 illustrates an enlarged view of a portion of FIG. 1.

The reading unit 110 may be disposed on the document feed path 123. As shown in FIG. 3, the reading unit 110 may include a reading sensor 111, which reads image information from the document fed from the automatic document feeder 120, and a glass portion 112, which is disposed on the reading sensor 111 to be in contact with the document. The glass portion 112 may be made of any transparent material that allows the information on the document to pass to the reading sensor 111. The reading sensor 111 may employ a contact image sensor (CIS), a charge coupled device (CCD), or other imaging sensor.

The automatic document feeder 120 may include a document inlet 121, which receives the document, a document outlet 122 which discharges the document, a document feed path 123 provided between the document inlet 121 and the document outlet 122, and rollers which may be disposed on the document feed path 123 to feed the document. The document inlet 121 may be disposed on one side of the document feed path 123. The document outlet 122 may be disposed on an opposing side of the document feed path 123. A document loading tray 124, on which a document D may be loaded, may be disposed adjacent to the document inlet 121. The document feed path 123 may be inclined toward the document outlet 122 from the document inlet 121.

The rollers adapted to feed the document may include a document feed roller 125, which picks up a document D loaded on the document loading tray 124 sheet by sheet to supply the document D to the document feed path 123, and a white roller 126, which feeds the document through the document feed path 123. The white roller 126 may face the reading unit 110, and maintain the document in contact with the glass portion 112. The white roller 126 and the reading unit 110 may be disposed in proximity to the document outlet 122. According to an embodiment, the white roller 126 may be disposed above the reading unit 112. After the rear end portion of the document passes the location where the white roller 126 is nearest to the glass portion 112, the document no longer receives a discharging force from the white roller 126. When the document being discharged encounters a sufficient friction with the surface B (see FIG. 4), onto which the document is being discharged or with other documents already piled on the surface B, the document may remain in the document outlet 122 without being fully discharged.

FIGS. 1 to 3 depict an embodiment, in which the image reading apparatus 100 may include at least one guide member 130, which may generate a widthwise curl on the trailing end of the document as the document is being discharged through the document outlet 122. When the document fails to be fully discharged, the curl of the document may allow a next discharged document to push the stalled document through the document outlet 122.

In one embodiment of the invention, the at least one guide member 130 may include a first guide rib 131 and a second guide rib 132 which are disposed at the document outlet 122. The first guide rib 131 and the second guide rib 132 may protrude toward the document feed path 123 and lift the document by interfering with the document as it is discharged through the document outlet 122. The first guide rib 131 and the second guide rib 132 may have a guide surface 133 facing the document feed path 123. The guide surface 133 guides the leading end of the document moving through the document feed path 123 such that the document may smoothly pass over the first guide rib 131 and the second guide rib 132. As seen in the embodiment shown in FIG. 3, the guide surface 133 may be formed in a convexly curved surface inclined upward in the moving direction of the document.

The first guide rib 131 may be disposed at one side of the document outlet 122 to slightly lift up one widthwise end portion of the document discharged through the document outlet 122, and the second guide rib 132 may be disposed at the other side of the document outlet 122 to slightly lift up the other end portion of the document. When the trailing end portion of the document is lifted up by the first guide rib 131 and the second guide rib 132, the trailing end portion of the document is unstably supported in the document outlet 122, and the document can be easily separated from the document outlet 122.

Figure 4:
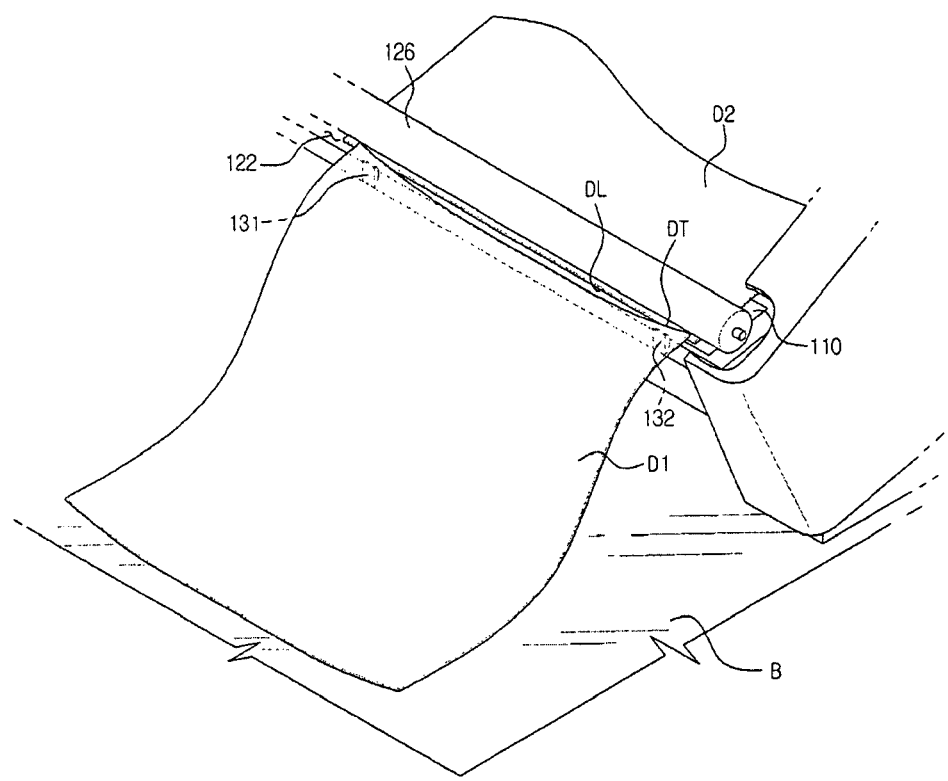
FIG. 4 is a diagram illustrating a document discharging operation according to an embodiment of the invention.

FIG. 4 illustrates an example of a document discharge process according to an embodiment of the invention. A trailing end portion DT of a document D1 may remain in the document outlet 122. The curl generated on the trailing end portion DT of the document D1 by the first guide rib 131 and the second guide rib 132 may allow the leading end portion DL of the next discharged document D2 to push the document D1 through the document outlet 122. Thus, it is possible to prevent a document jam or shuffle.

Figure 5:
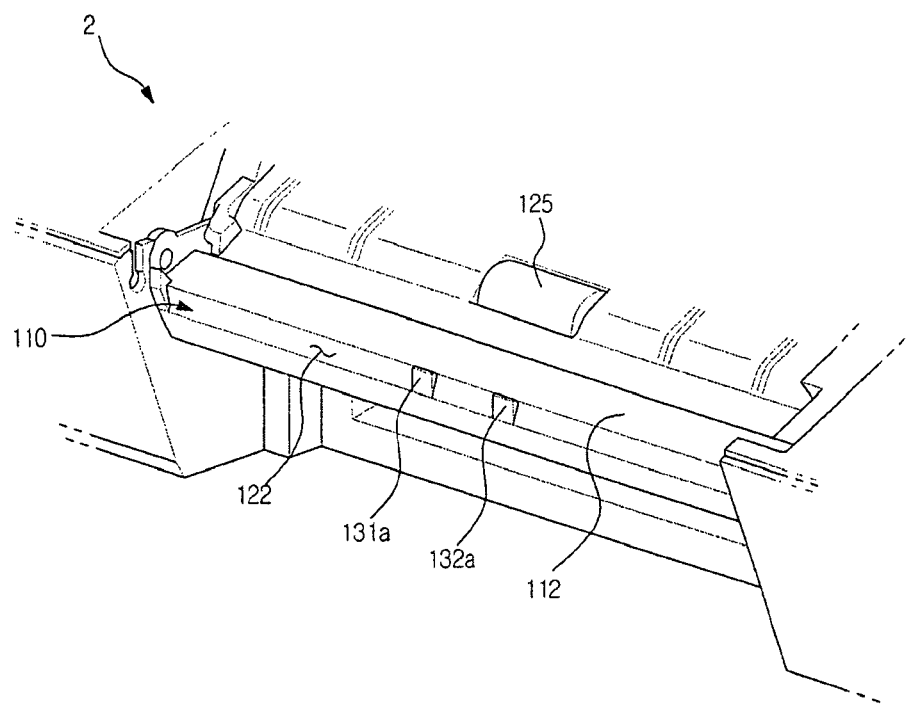
FIG. 5 illustrates a perspective view of a partial configuration of an image reading machine according to another embodiment of the invention.

FIG. 5 depicts an alternate embodiment of the invention. In this embodiment, a multi-functional machine 2 may include a first guide rib 131a and a second guide rib 132a which are disposed at central portions of the document outlet 122 to slightly lift a central portion of the document discharged through the document outlet 122. Although this embodiment has a difference in the shape of the curl generated in the document from the embodiment of FIG. 2, namely the direction of the curl, the document discharging is carried out in substantially the same manner as the embodiment of FIG. 2 and FIG. 4. That is, when a document is stalled at the document outlet 122, the curl generated on the trailing end portion DT of the document D1 by the first guide rib 131a and the second guide rib 132a may allow a leading end portion DL of the next discharged document D2 to push the document D1 through the document outlet 122.

Figure 6:
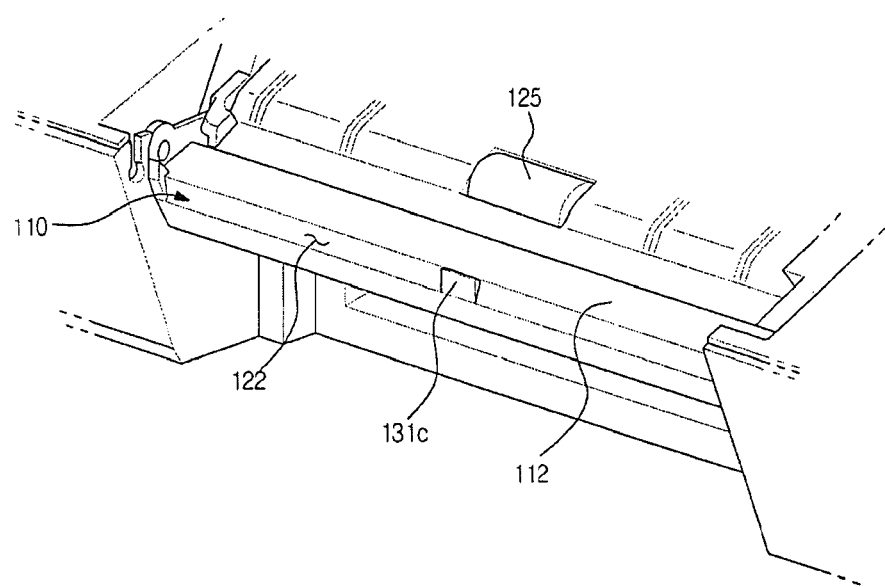
FIG. 6 illustrates a perspective view of a partial configuration of an image reading machine according to another embodiment of the invention.

Although two guide ribs are installed on the document outlet in the above embodiments, the number of the guide ribs may vary. For example, the embodiment shown in FIG. 6 contains one guide rib 131c installed on the document outlet 122. The guide rib 131c may be installed at the central portion of the document outlet 122 to slightly lift up the central portion of the document discharged through the document outlet 122, and produce a curl. However, the guide rib 131c may alternatively be disposed on the left or right side of the document outlet 122, and perform substantially the same function.

Although embodiments of the present invention have been shown and described, those skilled in the art can appreciate that changes may be made to these embodiments without departing from the principles and spirit of the invention, the scope of which is defined in the claims and their equivalents.

What is claimed is:

1. An image reading apparatus, comprising:
   a document feed path along which a document to be read travels, the document feed path including a document outlet through which the document exits the image reading apparatus;
   a reading unit disposed along the document feed path upstream of the document outlet with respect to a direction of travel of the document, the reading unit being configured to read an image of the document; and
   a guide member disposed at the document outlet, the guide member being configured to cause the document to curl at least at a trailing end of the document.

2. The image reading apparatus according to claim 1, wherein the guide member includes at least one guide rib having one end protruding toward the document feed path.

3. The image reading apparatus according to claim 2, wherein the at least one guide rib includes a first guide rib and a second guide rib which are disposed at locations corresponding to opposite lateral end portions of the document discharged through the document outlet.

4. The image reading apparatus according to claim 2, wherein the at least one guide rib is disposed at location corresponding to a central portion of the document discharged through the document outlet.

5. The image reading apparatus according to claim 2, wherein the at least one guide rib includes a guide surface configured to guide a leading end of the document moving toward the guide rib.

6. The image reading apparatus according to claim 1, wherein the document outlet is positioned in proximity to the reading unit.

7. The image reading apparatus according to claim 1, wherein the guide member is disposed so as to contact the trailing end of the document as the document exits the image reading apparatus.

8. The image reading apparatus according to claim 1, wherein the guide member is positioned in proximity to the reading unit.

9. The image reading apparatus according to claim 1, wherein the reading unit includes a glass portion in contact with the document, and
   wherein the image reading apparatus further comprises a white roller opposing the reading unit, the guide member being positioned between the white roller and the document outlet.

10. A multi-functional machine, comprising:
    a main body having a document feed path, along which a document to be read moves, the document path including a document outlet, through which the document exits the multi-functional machine;
    a reading unit which reads image information from the document in the document feed path;
    at least one guide member disposed at the document outlet configured to cause the document to curl, and the at least one guide member being configured to be in contact with a trailing end of the document as the document exits through the document outlet.

11. The multi-functional machine according to claim 10, wherein the guide member causes the document to curl at the trailing end of document, and
    wherein a leading end of a subsequent document discharged subsequent to the document interferes with the curled trailing end of the document so as to push the document out of the document outlet.

12. The multi-functional machine according to claim 10, wherein the at least one guide member is disposed at a lower portion of the document outlet, and includes at least one guide rib having one end protruding toward the document feed path.

13. The multi-functional machine according to claim 12, wherein the at least one guide rib comprises a first guide rib and a second guide rib disposed at opposite lateral ends of the document outlet such that the first guide rib lifts one side of the trailing end of the document being discharged through the document outlet, and such that the second guide rib lifts the other side of the trailing end of the document being discharged through the document outlet.

14. The multi-functional machine according to claim 12, wherein the at least one guide rib lifts a central portion of the trailing end of the document being discharged through the document outlet.

15. The multi-functional machine according to claim 10, further comprising:
    a roller disposed to oppose the reading unit, the roller being configured to rotate to convey the document along the document feed path, the roller being positioned sufficiently upstream of the document outlet such that the trailing end of the document moves out of the main body through the document outlet by freefall under a weight of the document without being aided by the roller.

16. A method of discharging documents through a document outlet, comprising:
    forming a curl on a trailing end portion of a first document at the document outlet with at least one guide member disposed at the document outlet; and
    feeding a second document through the document outlet so as to cause a leading end portion of the second document to push the curled trailing end portion of the first document out of the document outlet.

* * * * *